United States Patent
House et al.

(10) Patent No.: US 7,127,373 B2
(45) Date of Patent: Oct. 24, 2006

(54) SYSTEMS, METHODS AND COMPUTER PROGRAM PRODUCTS FOR ASSESSING THE HEALTH OF AN ELECTRIC MOTOR

(75) Inventors: Michael Brynn House, Clifton Park, NY (US); Gregory Lee Flickinger, Pittsburgh, PA (US); Narasimha Murthy Pappu, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/604,657

(22) Filed: Aug. 7, 2003

(65) Prior Publication Data

US 2005/0033557 A1 Feb. 10, 2005

(51) Int. Cl.
G06F 19/00 (2006.01)

(52) U.S. Cl. .......................... 702/182; 700/21

(58) Field of Classification Search ............... 702/184, 702/34, 35, 81, 181, 182–185; 700/21, 79; 706/45; 73/53.02, 118.1, 117.3, 787
See application file for complete search history.

(56) References Cited

U.S. PATENT DOCUMENTS

| | | | |
|---|---|---|---|
| 6,199,018 B1 | 3/2001 | Quist et al. | |
| 6,297,742 B1 | 10/2001 | Canada et al. | |
| 6,411,908 B1 * | 6/2002 | Talbott | 702/34 |
| 6,865,513 B1 * | 3/2005 | Ushiku et al. | 702/184 |
| 2002/0046012 A1 | 4/2002 | Takemura et al. | |
| 2002/0161457 A1 | 10/2002 | Hershey et al. | |

OTHER PUBLICATIONS

S.F. Farag and M.K. Jhaveri, "Intelligent microprocessor based devices provide advanced motor protection, flexible control and communication in paper mills," IEEE Trans. Industry Applications, vol. 33, No. 3, pp. 840-847, May/Hune 1997.

J. Sottile and J.L. Kohler, "An on-line method to detect incipient failure of turn insulation in random-wound motors," IEEE Transactions on Energy Conversion, vol. 8, No. 4, pp. 762-768, Dec. 1993.

P. O'Donnell, "Report of large motor reliability survey of industrial and commercial installations, Part I," IEEE Transactions on Industry Applications, vol. IA-21, No. 4, pp. 853-864, Jul./Aug. 1985.

P. O'Donnell, "Report of large motor reliability survey of industrial and commercial installations, Part II," IEEE Transactions on Industry Applications, vol. IA-21, No. 4, pp. 865-872, Jul./Aug. 1985.

House et al., "Consider online predictive technology to reduce electric motor maintenance costs," Hydrocarbon Processing; Jul. 2002, pp. 49-50.

Sutherland et al., "Prognostics, A New Look at Statistical Life Prediction for Condition-Based Maintenance," IEEE Aerospace Conference, Big Sky, Montana (Mar. 2003).

* cited by examiner

*Primary Examiner*—Edward Raymond
(74) *Attorney, Agent, or Firm*—Sutherland Asbill & Brennan LLP

(57) ABSTRACT

Systems, methods and computer program products calculate the life remaining in a machine, such as an electric motor, or the life remaining in individual components within a machine. Life remaining calculations are based on information collected from multiple sources, including operator input data, historical data, and lookup tables. Using this information the remaining useful life of the machine is calculated based on quantitative data, standard design life limits and on reliability analysis such that continuous historical parameter data is not required to analyze or assess the life of the machine.

26 Claims, 9 Drawing Sheets

SYSTEMS, METHODS AND COMPUTER PROGRAM PRODUCTS FOR ASSESSING THE HEALTH OF AN ELECTRIC MOTOR

BACKGROUND OF INVENTION

1. Field of the Invention

The present invention relates to electric motors, and more particularly, to systems, methods and computer program products for assessing the health of an electric motor without requiring access to extensive historical asset management and historical sensor data.

2. Background of the Invention

Although electric motors are rugged and reliable electromechanical energy conversion devices, they are subject to failure under mis-operation, severe operating conditions, hostile environments, and aging. The average annual failure rate of large electric machines is estimated to be at least three percent. In industries that require the motor to be operated under hostile conditions and environment, such as mining or pulp and paper industries, the annual failure rate can be much higher. Since motor failure has a potential for substantial financial loss, the demand for motor protection has increased, which has driven many researchers in industry and academia to explore new technologies in condition monitoring of electric machines and electrically driven equipment.

Access to historical repair information allows an understanding of the conditional failure probabilities of motor components. According to industry standards, almost one half of the total failures for electric motors are bearing-related. Additionally, one third or more failures are typically related to the winding insulation and core iron. Taking historical performance, failures and repairs of thousands of electric motors into account, probabilities of electric motor failure can be understood with reference to failure Pareto charts. Pareto charts, as are known to those of skill in the art, include a series of bars whose heights reflect the frequency of a problem. Here, given historical failure and repair information, a Pareto chart illustrates the most likely causes for electric motor failure.

Studies have shown that in most cases there is a general agreement between commercially published data and failures of electric motors. Unfortunately, however, greater variations exist in AC motors greater than 2300V. For instance, whereas bearing failures are more prevalent in induction motors due to the presence of a large population of rolling element bearings, in AC motors greater than 2300V AC stator failures replace bearing failures as the dominant problem.

Manufacturers have shown that continuous monitoring system technology is a proven way to reduce motor failures, lower total equipment ownership costs and estimate time-to-failure acceleration factors. Continuous monitoring methods are known to those of skill in the art. However, these systems cannot provide an immediate assessment on the condition of a motor if, for instance, a customer wishes to establish a maintenance/shared risk agreement with a electric motor provider in terms of residual life estimates.

What is therefore needed are systems or methods to rapidly ascertain a motor's health without requiring continuous monitoring or the accessing historical sensor data.

SUMMARY OF INVENTION

The present invention is directed generally to systems, methods and computer program products that assess the health of an electric motor without access to extensive historical asset management and historical sensor data. According to one embodiment of the invention, a motor assessment tool receives information specific to an electric motor to be analyzed, and produces computed results therefrom. The computed results identify the current health of the motor, such as the estimated time remaining in the stator life and bearing design life (if rolling element bearings are present), the number of days until oil breakdown, the days until the motor hits its start/stop limit, and the estimated times until bearing and stator repairs are required.

To generate such results, the motor assessment tool collects information from multiple sources, including operator input data, historical data, and lookup tables. Based on this information the motor assessment tool estimates the remaining useful life of a motor based on quantitative data, standard design life limits and on reliability analysis. As such the motor assessment tool enables a risk analyst to assess motor health when continuous historical parameter data is not available.

BRIEF DESCRIPTION OF DRAWINGS

Figure 1:
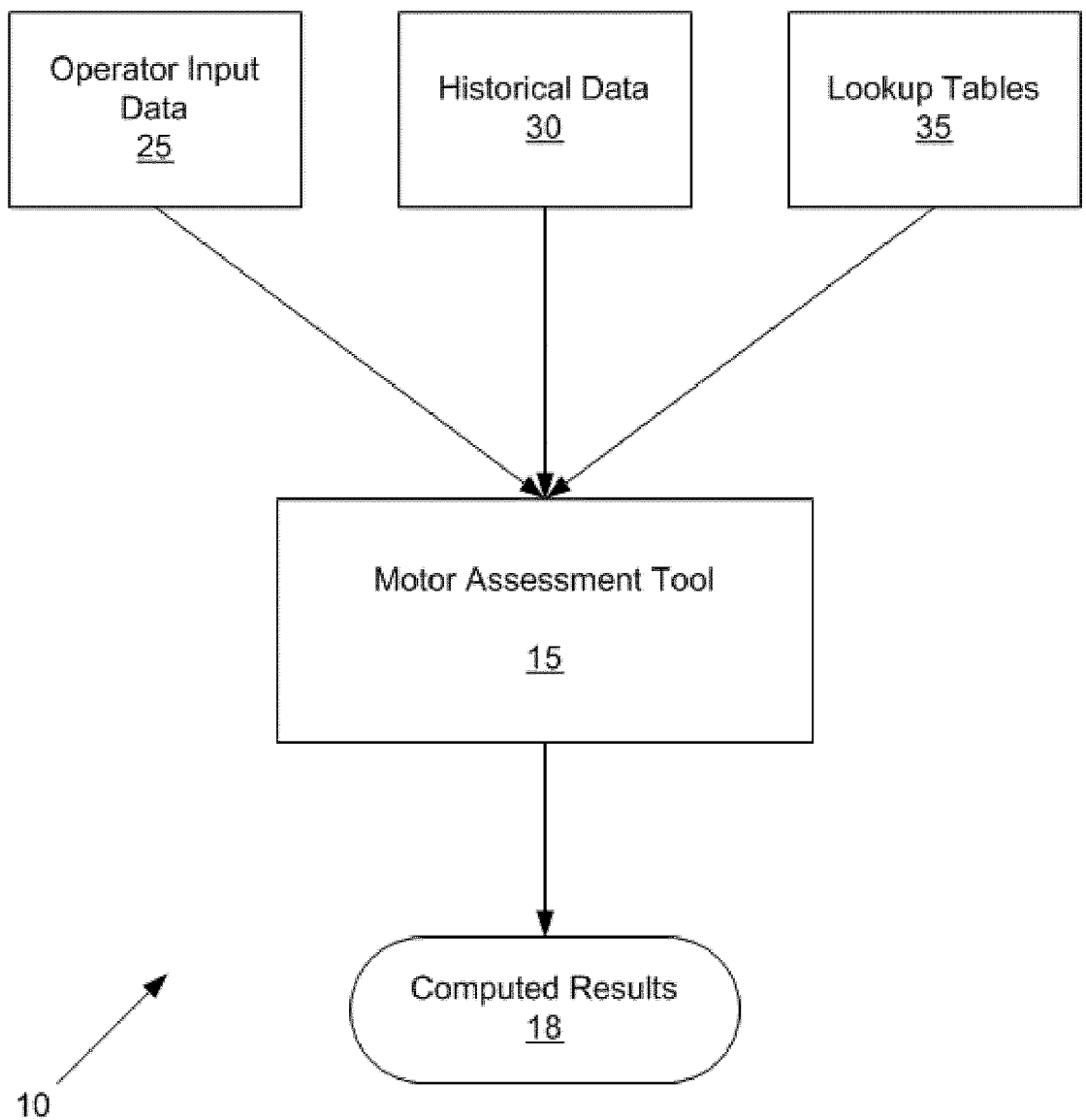

Having thus described the invention in general terms, reference will now be made to the accompanying drawings, which are not necessarily drawn to scale, and wherein:

FIG. 1 shows a block diagram illustrating components comprising a motor analysis system, according to one embodiment of the present invention.

Figure 2:
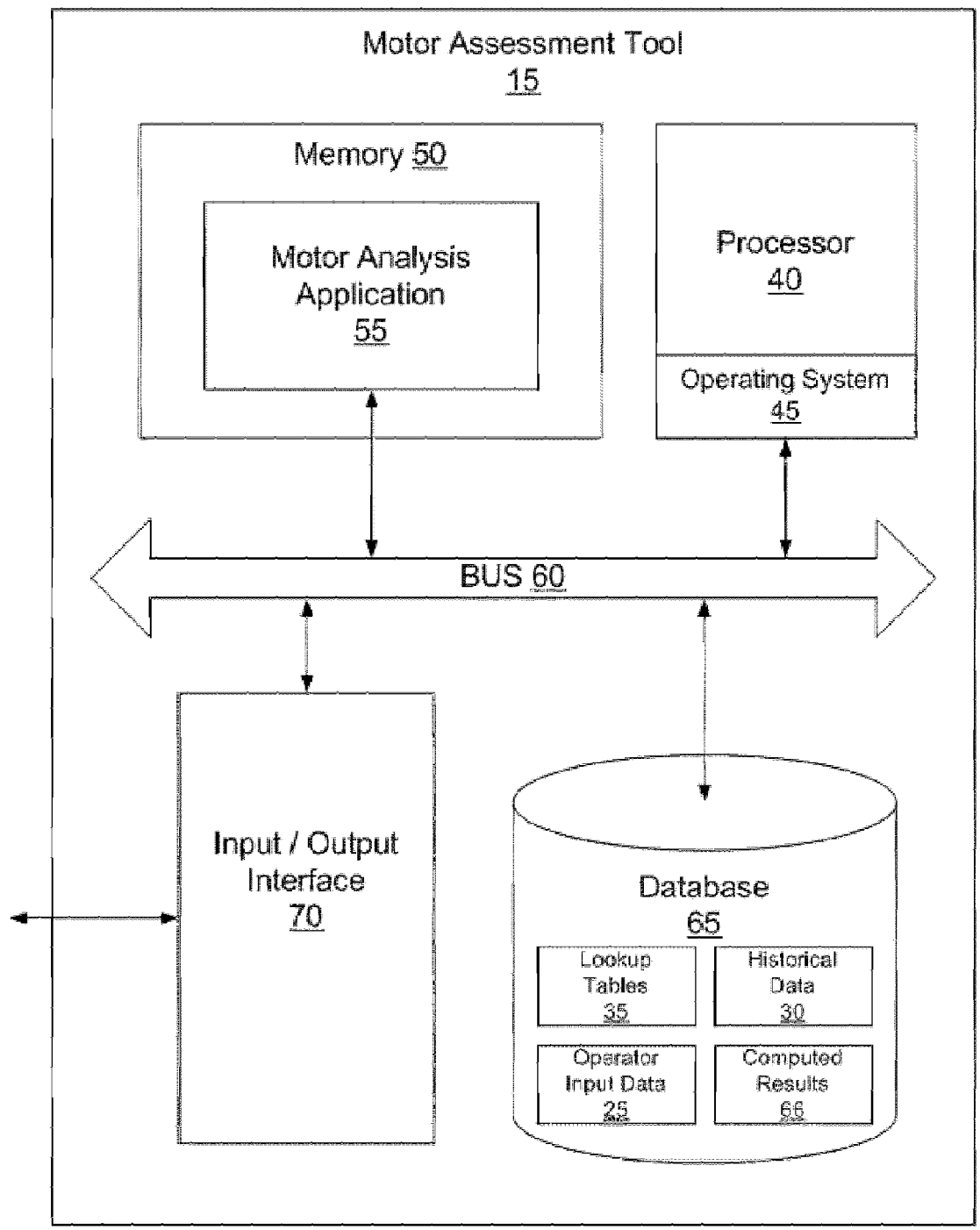

FIG. 2 shows a block diagram illustrating a motor assessment tool, according to one embodiment of the present invention.

Figure 3:
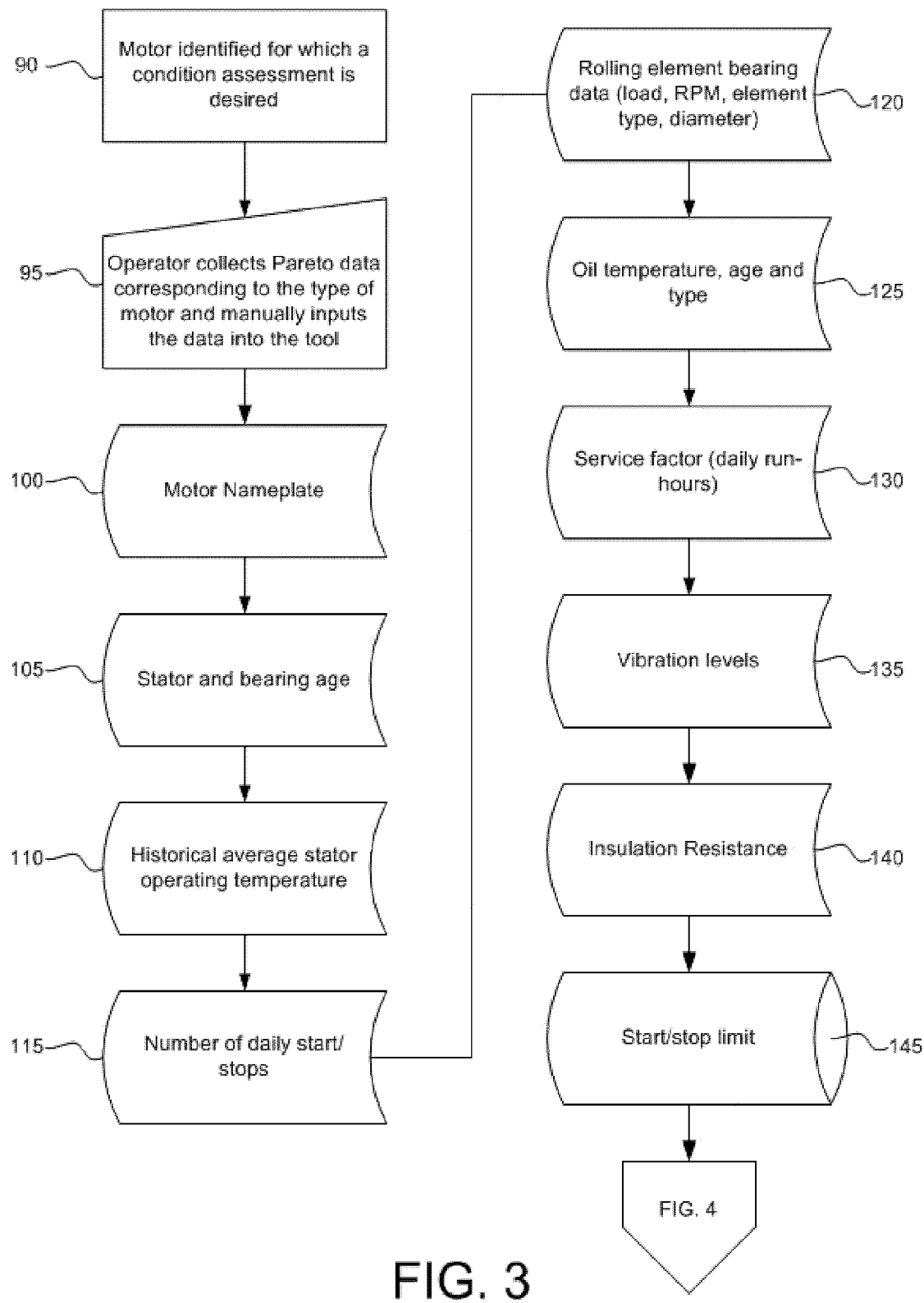

FIG. 3 shows a block diagram flow chart illustrating a method for inputting data into the motor assessment tool, according to one embodiment of the present invention.

Figure 4:
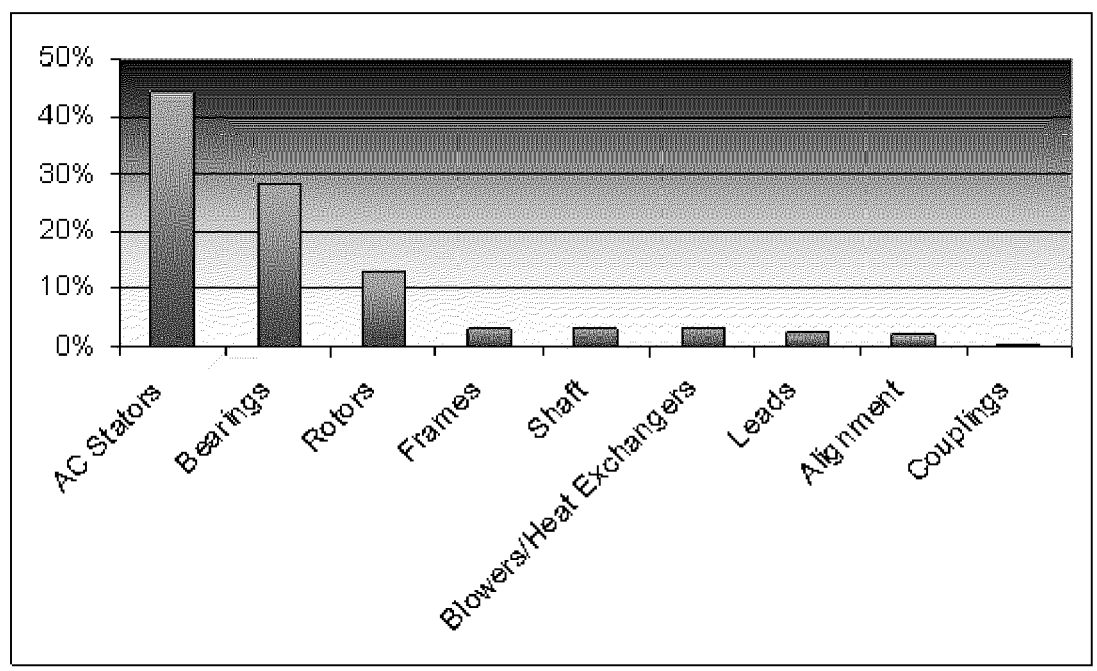

FIG. 4 shows Pareto data corresponding to a large electric motor, according to one illustrative example of the present invention.

Figure 5:
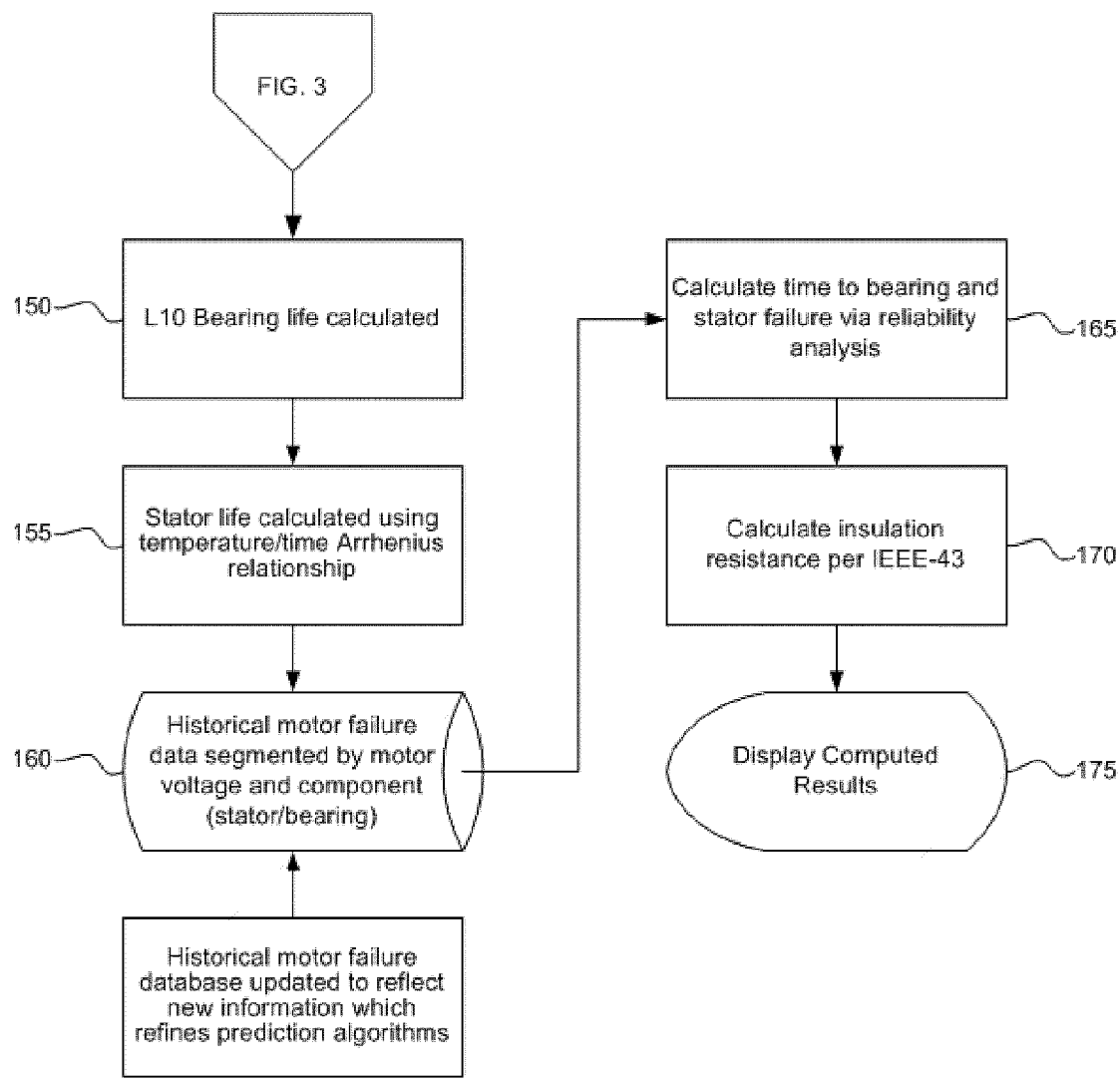

FIG. 5 shows a block diagram flow chart illustrating computations executed by the motor assessment tool to produce computed results, according to one embodiment of the present invention.

Figure 6:
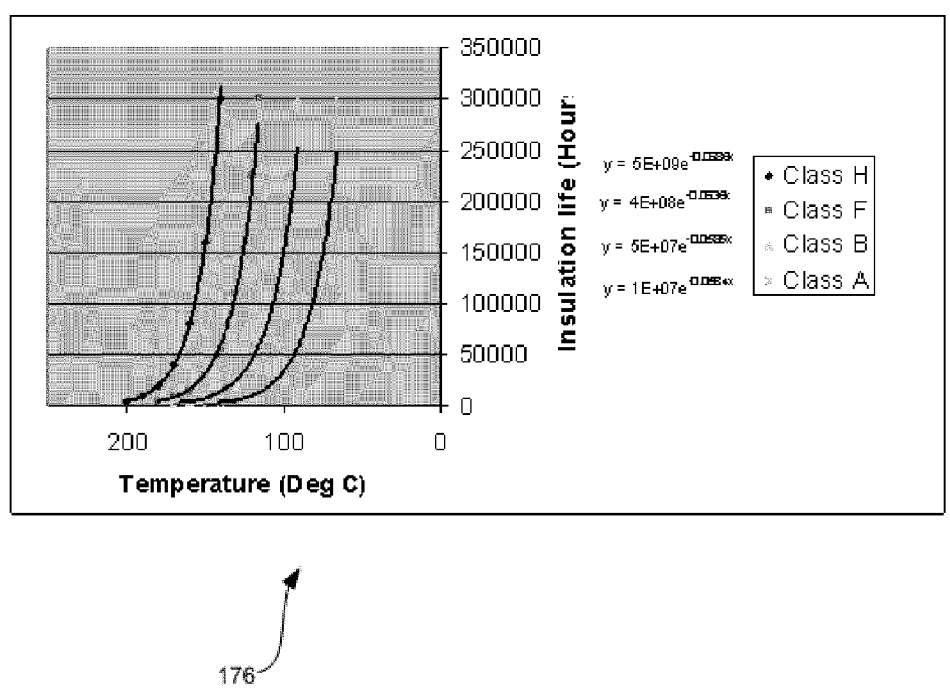

FIG. 6 shows the transfer functions for expected stator insulation life as a function of temperature and insulation class, according to one illustrative example of the present invention.

Figure 7:
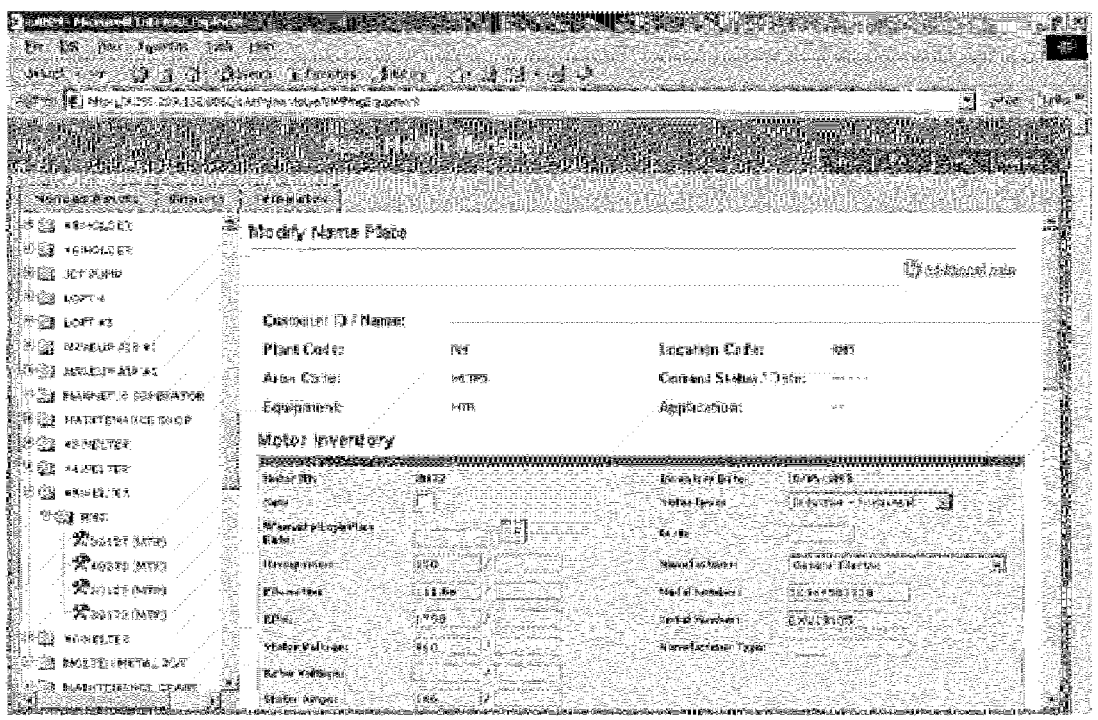

FIG. 7 shows an interface through which a user may maintain repair service data for a motor, according to one embodiment of the invention.

Figure 8:
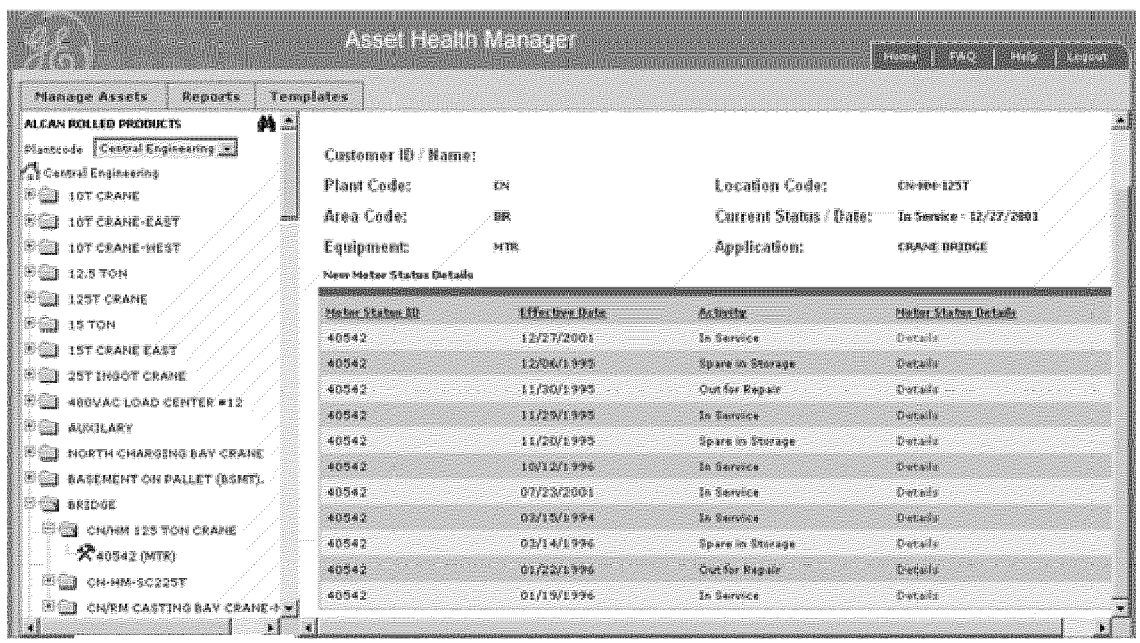

FIG. 8 shows another interface through which a user may maintain repair service data for a motor, according to one embodiment of the invention.

Figure 9:
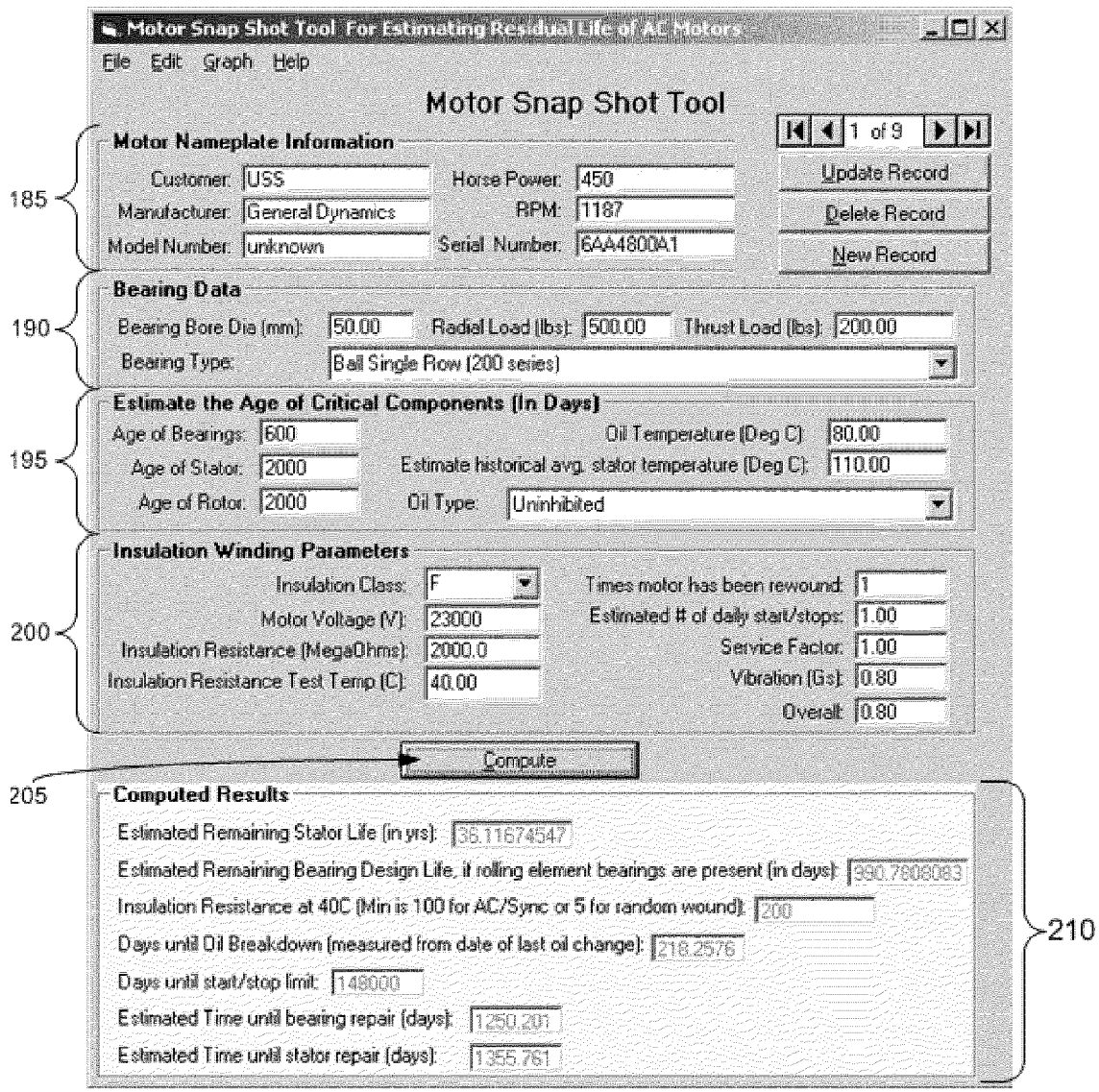

FIG. 9 illustrates a graphical user interface implemented by the motor assessment tool to facilitate the input of data by an operator of the motor analysis system, according to one embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the flowchart block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks.

FIG. 1 shows a block diagram illustrating the components of a motor analysis system 10 according to one embodiment of the present invention. As illustrated in FIG. 1, the system 10 includes a motor assessment tool 15. Generally, the motor assessment tool 15 receives information specific to an electric motor to be analyzed, and produces computed results 18 therefrom, where the computed results 18 identify the current health of the electric motor. As described in greater detail below, the computed results 18 include information such as: the estimated time remaining in the stator life of the motor, the estimated time remaining in bearing design life of the motor (if rolling element bearings are present), the motor's insulation resistance at 40C, the number of days until oil breakdown, the days until the motor hits its start/stop limit, the estimated time until a bearing repair is required, and the estimated time until a stator repair is required.

To generate the computed results 18, the motor assessment tool 15 collects information from multiple sources, including operator input data 25, historical data 30, and lookup tables 35. Taking this information the motor assessment tool 15 applies a number of calculations to estimate the remaining useful life of a motor based on quantitative data, standard design life limits and on reliability analysis. These calculations also compute the estimated life remaining in individual motor components such as the stator and bearing. Therefore the motor assessment tool 15 enables a risk analyst to assess motor health when continuous historical parameter data is not available. The present invention will be next be described in greater detail with respect to FIGS. 2–4, which illustrate the motor assessment tool and the method implemented thereby.

FIG. 2 shows a block diagram showing a motor assessment tool 15 of the motor analysis system 10, according to one aspect of the present invention. As illustrated in FIG. 2, the motor assessment tool 15 generally comprises a processor 40, operating system 45, memory 50, input/output interface 70, database 65 and bus 60. The bus 60 includes data and address bus lines to facilitate communication between the processor, operating system and the other components within the tool 15, including the motor analysis application 55, the input/output interface 70 and the database 65. The processor 40 executes the operating system 45, and together the processor 40 and operating system 45 are operable to execute functions implemented by the motor assessment tool 15, including software applications stored in the memory 50, as is well known in the art. Specifically, to implement the methods described herein with respect to FIGS. 3–5 the processor 40 and operating system 45 are operable to execute the motor analysis application 55 stored within the memory 50.

It will be appreciated that the memory 50 in which the motor analysis application 55 resides may comprise random access memory, read-only memory, a hard disk drive, a floppy disk drive, a CD Rom drive, or optical disk drive, for storing information on various computer-readable media, such as a hard disk, a removable magnetic disk, or a CD-ROM disk. Generally, the motor analysis application 55 receives information input or received by the motor assessment tool 15, including operator input data 25, historical data 30 and information provided or retrieved from one or more lookup tables 35. Using this information the motor analysis application 55 effects the computations described in detail with reference to FIG. 5 and generates the computed results that identify the current health of the electric motor, including the motor life remaining. The motor analysis application 55 also provides one or more graphical user interfaces (GUIs) through which an operator of the motor assessment tool 15 can input data and view the computed results. A GUI according to one embodiment of the invention is illustrated and considered in FIG. 9.

Referring again to FIG. 2, the processor 40 is in communication with the Input/Output (I/O) interface 70 to control I/O devices of the tool 15. Typical user I/O devices may include a video display, a keyboard, a scanner, a mouse or joystick or other input or output devices. Additionally, the I/O interface 70 provides one or more I/O ports and/or one or more network interfaces that permit the motor assessment tool 15 to receive and transmit information from the tool 15. For instance, according to one aspect of the invention, the motor assessment tool 15 may retrieve data from remote sources, such as via a LAN, WAN, the Internet, or the like, to implement the functions described herein. Therefore, the I/O interface 70 may also include a system, such as a modem, for effecting a connection to a communications network.

The database 65 of the motor assessment tool 15, which is connected to the bus 36 by an appropriate interface, may include random access memory, read-only memory, a hard disk drive, a floppy disk drive, a CD Rom drive, or optical disk drive, for storing information on various computer-readable media, such as a hard disk, a removable magnetic disk, or a CD-ROM disk. In general, the purpose of the database 65 is to provide non-volatile storage to the motor assessment tool 15. As shown in FIG. 2, the database includes one or more tables, segments or files within the database 65, including lookup tables 35, operator input data 25, and historical data 30, which is used by the motor assessment tool 15, and more particularly, the motor analysis application 55, to execute the functions described herein to generate computer results. The database 65 also stores the computed results 66 of the analysis implemented by the tool 15.

It is important to note that the computer-readable media described above with respect to the memory 50 and database 65 could be replaced by any other type of computer-readable media known in the art. Such media include, for example, magnetic cassettes, flash memory cards, digital video disks, and Bernoulli cartridges. It will be also appreciated by one of ordinary skill in the art that one or more of the motor assessment tool 15 components may be located geographically remotely from other motor assessment tool 15 components. For instance, the lookup tables 35 and historical data 30 may be located geographically remote from the motor assessment tool 15, such that historical data and lookup tables are accessed or retrieved from a remote source in communication with the tool 15 via the I/O interface 70.

It should also be appreciated that the components illustrated in FIG. 2 support combinations of means for performing the specified functions described herein. As noted above, it will also be understood that each block of the block diagrams, and combinations of blocks in the block diagrams, can be implemented by special purpose hardware-based computer systems that perform the specified functions or steps, or combinations of special purpose hardware and computer instructions. Further, the motor assessment tool 15 may be embodied as a data processing system or a computer program product on a computer-readable storage medium having computer-readable program code means embodied in the storage medium. Any suitable computer-readable storage medium may be utilized including hard disks, CD-ROMs, DVDs, optical storage devices, or magnetic storage devices. Accordingly, the motor assessment tool 15 may take the form of an entirely hardware embodiment, an entirely software embodiment or an embodiment combining software and hardware aspects, such as firmware.

According to a preferred embodiment, the motor assessment tool 15 represents a stand-alone software application operating on a Windows® operating system, where the motor analysis application represents 55 the functions implemented thereby, and the database 65 represents a Windows® Access database. However, the tool 15 may be implemented using alternative operating systems and databases as are known to those of skill in the art.

Furthermore, though illustrated individually in FIG. 2, each component of the tool 15 may be combined with other components within the motor assessment tool 15 to effect the functions described herein. The functions of the present invention will next be described in detail with reference to block diagram flowcharts describing the exchange of and processing of information by and between the individual elements of FIG. 1, as well as the elements that comprise the embodiment of the motor assessment tool 15 illustrated in FIG. 2.

As noted above, the motor assessment tool 15 is operable to estimate, among other things, the remaining life remaining in an electric motor. According to one aspect of the present invention, the tool 15 performs a number of calculations based on analytical methods based on motor design limits, and on reliability data generated from historical information and operator-input information specific to a motor to be analyzed. The life remaining in the motor may then be identified based on the lowest remaining life time calculated using these methods. These methods also attempt to predict the remaining life left in components of a motor, such as the remaining bearing and stator life.

More specifically, the motor assessment tool 15 uses multiple testing methods to assess the current health of an electric motor, including a: (1) $L_{10}$ bearing life calculation (only if rolling element type bearings are present in the motor to be analyzed); (2) motor stator life estimate based on environmental conditions, specifically, the average historical stator temperature; (3) IEEE-43 test to measure motor insulation resistance; (4) motor stator life estimate based on historical stator life span information based on the number of motor start/stops; (5) reliability analysis of major motor components using statistical regression methods; (6) remaining oil life based on oil type, temperature and age; and (7) qualitative descriptions of percent daily usage and vibration levels that may indicate accelerated or decelerated life with respect to nominal conditions. Each of the above quantitative methods yields a number that aids an operator or analyst in assessing motor health, and the most limiting life estimate is then used to predict the residual life of the motor.

FIG. 3 shows a block diagram flow chart illustrating a method for inputting, collecting and storing in the motor assessment tool 15, according to one embodiment of the present invention. After a motor is identified for which an analysis (also referred to herein as a condition assessment) is desired (block 90), an operator collects Pareto data corresponding to the type of motor and manually inputs the data into the tool 15. The Pareto data quantifies the most probable failure reason for the motor based on historical information collected for similar types of motors. An illustrative example of Pareto data 71 for large electric motors (>2300 VAC) is illustrated in FIG. 4. As shown in FIG. 4, the Pareto data 71 illustrates that AC stator failure is the cause of more motor failures than any other cause, followed by bearing failures, rotors, and frames. Additionally, the Pareto data 71 identifies a percentage attributed to each of the causes such that the likelihood of a particular cause impacting a randomly selected motor can be estimated. Because the Pareto data 71 is preferably created using a large volume of samples for each type of motor, the Pareto data 71 may be an excellent predictor of the likely cause of motor failure for a given type of motor. According to one aspect of the present invention, the Pareto data 71 comprises a part of the historical data 30.

Next, the operator inputs motor information into the tool 15, including the motor nameplate (block 100) and the motor's stator and bearing age (block 105). Other information collected and input into the tool 15 includes the historical average stator operating temperature (block 110). Such data is collected from the physical nameplate mounted on the exterior of the motor, maintenance/asset management databases (e.g., System1™), historical records from equipment distributed control systems, and/or operator log records. Also collected by the operator are the number of daily starts and stops (block 115), rolling element bearing data (block 120) including the rolling element's load, rotations per minute (RPM), element type, and diameter, the oil temperature and its age and type (block 125), the number of daily run-hours (also referred to as the motor's service factor) (block 130), the motor's vibration levels (block 135) measured using handheld vibration monitoring equipment or recorded from attached accelerometers, velometers or displacement probes, and the motor's insulation resistance (block 140).

All of the operator input data 25 described above is collected and stored by the system of the present invention in one or more databases, such as in the database 65 of FIG. 2, for manipulation by the motor analysis application 55. Additional data may be input into the tool 15 directly from the motor, such as the start and stop limit (block 145) of the motor. This information may be received by the tool 15 via the I/O Interface 70 described with respect to FIG. 2, and may be stored within the database 65.

Next, FIG. 5 shows a block diagram flow chart illustrating computations executed by the motor assessment tool 15 to produce computed results, according to one embodiment of the present invention. First, the motor assessment tool 15, and more particularly, the motor analysis application 55, executes $L_{10}$ life calculations (block 150) if rolling element bearings are present in the motor. This calculation is performed using the formula:

$$L_{10} = \frac{16,700}{N}\left(\frac{C}{P}\right)^K \quad (1)$$

where C is the load factor rating, K is a constant (3 for ball bearings, 10/3 for roller element bearings), N is the rotational speed and P is the equivalent load. The constant C is provided via lookup tables 35 that may be stored within the database 65. These look-up tables 35 contain the basic load rating (C), as is known in the art, which is variable according to the motor bearing type and size. Transfer functions for C may also be computed by the application 55 based on least squares regression. These transfer functions are dependent upon the rolling element type of the motor (e.g., single row, double row, spherical or cylindrical). The transfer functions allow for data interpolation when the bearing bore diameter is between those listed within the lookup tables 35. Alternatively, detailed lookup tables may be provided to render the need for transfer functions obsolete, where the application 55 is operable to select the load factor rating C for any motor bearing type and size. The result of the $L_{10}$ life calculation is to provide a life estimate for the motor's rolling element bearings, which may be used to estimate the remaining life of the motor until rolling element bearing failure.

Next, the motor analysis application 55 is also operable to calculate the stator insulation life remaining for the motor (block 155) based upon well known Arrhenius relationship described as a function of insulation class, as illustrated in FIG. 6. FIG. 6 shows the transfer functions for expected stator insulation life (in hours) as a function of stator temperature and motor insulation class. According to one aspect of the invention, average stator temperatures may be recorded from a facility's distributed control system. The peak temperature is used to track the remaining hours of insulation life based on insulation classes, such as insulation classes H, F, B or A. The current age of the stator is then subtracted from this remaining life to yield an estimated time-to-failure (block 165) of the motor as limited by the effective life of the stator.

According to one embodiment of the invention, the systems, methods and computer program products of the present invention use historical data obtained through motor repair service centers to calculate the probability that the motor stator or bearing will fail. In particular, historical motor failure logs segmented by motor voltage and component (stator or bearing) may be input into the motor analysis application 55 (block 160). As new repair service data becomes available the historical repair database grows through end-user experience, the uncertainty of the prediction tool is reduced. Therefore, the prediction algorithms become better able to provide quantitative information regarding remaining motor life, particularly, as more and different classes of motors become cataloged. A database of repair service data may be maintained and operated on a centralized web server accessible via the Internet using GUIs, such as those interfaces 176, 178 illustrated in FIGS. 7 and 8. Using these interfaces 176, 178 users can input data from a variety of remote locations. Periodically, this data is used to generate new probability distribution functions for the motor components, and is made available to the tool 15. According to one aspect of the invention, the historical information is categorized into AC motors operating at 2300V and AC motors operating at voltages equal to or greater than 4160V.

Using historical information, probability distribution functions for stator and bearing failures may be fit to the following function:

$$r(t) = \frac{\beta}{\eta}\left(\frac{t}{\eta}\right)^{\beta-1} e^{-\left(\frac{t}{\eta}\right)^\beta} \quad (2)$$

where $\beta$ and $\eta$ are the shape and scale factors of a Weibull distribution, as is known in the art, and t is time. Equation (2) was integrated and rearranged to provide an estimate to the 90% unreliability point, knowing the historical values of $\beta$ and $\eta$:

$$t = \eta(\ln 0.9)^{\frac{1}{\beta}} \quad (3)$$

Using this equation the motor analysis application 55 subtracts the current age of the bearing and stator from this calculated time (on a per component basis) to yield the estimated residual life.

The estimated remaining useful life of the motor's lubrication may also be obtained by the motor analysis application through comparison of the age, type and historical temperature to look-up tables obtained from tribology sources, as are known in the art. Finally, it will be appreciated that the tool 15 may capture and store overall vibration levels and service usage factors for qualitative purposes and such data may reveal additional sources of variation in expected residual life that is not captured in the above calculations. Finally, after all of the calculations are completed, the motor analysis application 55 displays the computed results (block 175) to the operator via a GUI and an I/O device such as a monitor.

Using a 90% unreliability point as an artificial limit for when motor failure will likely occur, the motor analysis application 55 subtracts the current age of the bearing and stator from this calculated time (on a per component basis) to yield the estimated residual life. These reliability calculations may be implemented based on each type of motor. As an illustrative example, using the above equations and Weibull parameters of $\beta=2.583$ and $\eta=388.7.050$ for a rolling element bearing and $\beta=3.648$ and $\eta=5596.552$ for a stator (where these parameters are calculated based on a Weibull analysis of historical information) may result in a reliability equation of:

$$e^{-(t/3887.05)^{2.583}} e^{-(t/5596.552)^{3.648}}$$

for a 2300VAC motor having rolling element bearings. In this illustrative example, the time for the motor to reach 90% reliability is calculated to be 1567 days.

Yet another life indicating analysis performed by the motor analysis application 55 is an insulation resistance tests using conventional IEEE methods, as are well known in the art. Insulation resistance tests ascertain the quality of the stator/rotor winding resistance (block 170). Values are dependent upon the winding type (random or standard) and may be flagged by the motor analysis application 55 if out of specification with respect to the IEEE method.

Highly accelerated lifetime test (HALT) data may also be input into the application 55 to show the maximum limit of start/stops that a motor winding can withstand before failure.

Therefore, this data may be used by the application 55 to indicate if a limiting problem exists with motor start/stops.

Moreover, an estimated remaining useful life of the motor's lubrication may also be obtained by the motor analysis application through comparison of the age, type and historical temperature to look-up tables obtained from tribology sources, as are known in the art. Finally, it will be appreciated that the tool 15 may capture and store overall vibration levels and service usage factors for qualitative purposes and such data may reveal additional sources of variation in expected residual life that is not captured in the above calculations.

After all of the calculations are completed, the motor analysis application 55 displays the computed results (block 175) to the operator via a GUI and an I/O device such as a monitor. As noted above, the application 55 may provide a value indicating the life remaining of the motor, which may be based on the shortest amount of life left as calculated using each of the methods described above. The application 55 may also provide individual results, such as the time remaining before stator or bearing failure.

FIG. 9 illustrates a graphical user interface implemented by the motor assessment tool 15 to facilitate the input of data by an operator of the motor analysis system, according to one embodiment of the present invention. As shown in FIG. 9, an operator may input motor nameplate information 185 into the GUI, as well as bearing data 190, an estimate of the age of critical components 195, and insulation winding parameters 200. Preferably, after pressing a compute button 205 or the like, the motor analysis application 55 will take the operator input data, store it in the database 65, and use the operator input data, lookup tables 35, and historical data 30 to execute the computations detailed above. Thereafter the computer results 210 are provided to the operator.

It will be appreciated that the cumulative effect of the motor assessment tool 15 is to calculate the motor's residual life based upon quantitative data, standard design life limits and reliability analysis. This enables the risk analyst to assess motor health when continuous historical parameter data is not available, and does so immediately, e.g., in a one-day period.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the present invention may be embodied in many forms and should not be limited to the embodiments described above. For instance, the present invention may be used to evaluate wind turbines, electric transformers, generators, and hydro-powered equipment. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A machine life indicating system, comprising:
means for receiving historical data, the historical data providing an indication of the operating lifetime of major components within machines of a particular type;
means for calculating the life remaining in a machine using, the historical data and the $L_{10}$ life calculation, wherein the $L_{10}$ life calculation comprises the load factor rating and the rotational speed of the machine; and
means for displaying the life remaining in the machine.

2. The system of claim 1, further comprising means for receiving environmental data pertaining to the environment in which the machine operates, and wherein the means for calculating the life remaining further comprises means for calculating the life remaining in the machine using, at least in part, the environmental data.

3. The system of claim 2, wherein the means for calculating the life remaining in the machine uses probability distribution functions and comprises means for calculating the life remaining in the machine using probability distribution functions for individual components within the machine.

4. The system of claim 3, wherein the machine is an electric motor and the individual components comprise components selected from the group consisting of a stator and a bearing.

5. The system of claim 2, wherein the machine is selected from the group of machines consisting of a transformer, a wind turbine, and a generator.

6. The system of claim 2, wherein the means for receiving historical data is operable to receive the historical data from a device other than the machine.

7. The system of claim 2, wherein the means for receiving historical data is operable to receive the historical data in batch form such that the historical data is not continuously or intermittently received by the means for receiving.

8. The system of claim 2, wherein the operator input data comprises the age of the machine stator or bearing.

9. The system of claim 2, wherein the operator input data comprises machine information selected from the group of machine information consisting of: average stator operating temperature, number of daily machine starts, number of daily machine stops, rolling element load, rolling element rotations per minute, rolling element type, rolling element diameter, oil temperature, oil age, oil type, the number of daily run-hours, and machine vibration levels.

10. The system of claim 1, wherein the means for calculating the life remaining in the machine using probability distribution functions comprises means for calculating the life remaining in the machine using probability distribution functions for individual components within the machine.

11. The system of claim 1, wherein the machine is selected from the group of machines consisting of a transformer, a wind turbine, an electric motor, and a generator.

12. The system of claim 1, wherein the means for receiving operator input data is operable to receive the operator input data such that the operator input data is not continuously received by the means for receiving.

13. The system of claim 1, wherein the machine is within a class of machines defined by the machines of the particular type.

14. The system of claim 1, wherein the means for calculating the life remaining in a machine comprises means for calculating the life remaining in the machine based on the life remaining in at least one component within the machine.

15. A machine life indicating system, comprising: means for receiving operator input data, the operator input data providing information specific to the operation history of a machine; means for calculating the life remaining in the machine using the operator input data, wherein the means for calculating the life remaining in the machine comprises means for calculating the life remaining in the machine using historical data and an $L_{10}$ life calculation; and means for displaying the life remaining in the machine.

16. A machine life indicating system, comprising:
means for receiving operator input data, the operator input data providing information specific to the operation history of a machine;
means for calculating the life remaining in the machine using, at least in part, the operator input data, wherein the means for calculating the life remaining in the machine comprises means for calculating the life remaining in the machine based at least in part on the insulation class of the machine; and
means for displaying the life remaining in the machine.

17. A machine life indicating system, comprising:
means for receiving operator input data, the operator input data providing information specific to the operation history of a machine;
means for calculating the life remaining in the machine using, at least in part, the operator input data, wherein the means for calculating the life remaining in the machine comprises means for calculating the life remaining in the machine based at least in part on a insulation resistance test class of the machine; and
means for displaying the life remaining in the machine.

18. A method for calculating the life remaining in a machine, comprising:
receiving operator input data, the operator input data providing information specific to the operation history of a machine;
calculating the life remaining in the machine using, at least in part, the operator input data wherein calculating the life remaining in the machine comprises calculating the life remaining in the machine using an $L_{10}$ life calculation; and
displaying the life remaining in the machine.

19. The method of claim 18, wherein calculating the life remaining in the machine using probability distribution functions comprises calculating the life remaining in the machine using probability distribution functions for individual components within the machine.

20. The method of claim 18, wherein the machine is selected from the group of machines consisting of a transformer, a wind turbine, an electric motor, and a generator.

21. The method of claim 18, wherein receiving operator input data comprises receiving operator input data such that the operator input data is not continuously received.

22. A method for calculating the life remaining in a machine comprising:
receiving operator input data, the operator input data providing information specific to the operation history of a machine;
calculating the life remaining in the machine using, at least in part, the operator input data wherein calculating the life remaining in the machine comprises calculating the life remaining in the machine based at least in part on the insulation class of the machine; and
displaying the life remaining in the machine.

23. A method for calculating the life remaining in a machine, comprising:
receiving operator input data, the operator input data providing information specific to the operation history of a machine;
calculating the life remaining in the machine using, at least in part, the operator input data wherein calculating the life remaining in the machine comprises calculating the life remaining in the machine based at least in part on a insulation resistance test class of the machine; and
displaying the life remaining in the machine.

24. A machine life indicating system, comprising; an assessment tool operable to receive operator input data, the operator input data providing information specific to the operation history of a machine, wherein the assessment tool is operable to calculate the life remaining in the machine using historical data and an $L_{10}$ life calculation; an analysis application, in communication with the assessment tool, the analysis application operable to calculate the life remaining in the machine using, at least in part, the operator input data; and a display for displaying the life remaining in the machine.

25. A machine life indicating system, comprising:
an assessment tool operable to receive operator input data, the operator input data providing information specific to the operation history of a machine wherein the assessment tool is operable to calculate the life remaining in the machine based at least in part on the insulation class of the machine;
an analysis application, in communication with the assessment tool, the analysis application operable to calculate the life remaining in the machine using, at least in part, the operator input data; and
a display for displaying the life remaining in the machine.

26. A machine life indicating system, comprising:
an assessment tool operable to receive operator input data, the operator input data providing information specific to the operation history of a machine wherein the assessment tool is operable to calculate the life remaining in the machine based at least in part on a insulation resistance test class of the machine.

* * * * *